United States Patent
Goldfarb et al.

(10) Patent No.: US 7,322,375 B2
(45) Date of Patent: Jan. 29, 2008

(54) HIGH BANDWIDTH ROTARY SERVO VALVES

(75) Inventors: Michael Goldfarb, Franklin, TN (US); Eric J. Barth, Nashville, TN (US); Kevin B. Fite, Nashville, TN (US); Jason E. Mitchell, Joelton, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

(21) Appl. No.: 11/120,140

(22) Filed: May 2, 2005

(65) Prior Publication Data

US 2006/0096644 A1    May 11, 2006

Related U.S. Application Data

(60) Provisional application No. 60/567,156, filed on Apr. 30, 2004.

(51) Int. Cl.
*F16K 11/08* (2006.01)
(52) U.S. Cl. .......................... 137/625.32; 137/625.22; 137/625.24; 251/283
(58) Field of Classification Search ........... 137/625.21, 137/625.22, 625.23, 625.34, 625.32, 625.43; 251/283
See application file for complete search history.

(56) References Cited

U.S. PATENT DOCUMENTS

| 2,047,615 | A | * | 7/1936 | Chadborn | 137/625.24 |
| 2,234,322 | A | * | 3/1941 | Sicard | 137/625.23 |
| 2,547,929 | A | * | 4/1951 | Dawson | 137/625.23 |
| 3,015,344 | A | * | 1/1962 | Hausmann et al. | 137/625.23 |
| 3,199,539 | A | * | 8/1965 | Leathem | 137/625.24 |
| 3,442,291 | A | * | 5/1969 | Carls | 137/625.41 |
| 3,454,049 | A | * | 7/1969 | Hoos | 137/625.65 |
| 4,177,834 | A | * | 12/1979 | Bonney | 137/625.23 |
| 4,800,924 | A | * | 1/1989 | Johnson | 137/625.23 |
| 5,467,800 | A |   | 11/1995 | Sallas | 137/625.65 |
| 5,522,416 | A | * | 6/1996 | Farrell et al. | 137/625.24 |
| 5,954,093 | A | * | 9/1999 | Leonard | 137/625.23 |

* cited by examiner

*Primary Examiner*—John Fox
(74) *Attorney, Agent, or Firm*—Fulbright & Jaworski L.L.P.

(57) ABSTRACT

A valve includes a rotating, substantially pressure-balanced spool that selectively aligns openings within the spool with openings within a sleeve to selectively connect ports of a manifold for gas or liquid routing. A valve may also include a stem, a needle coupled to the stem, a seat configured to receive the needle, a reservoir, an outlet coupled to the reservoir, and a servo motor coupled to the stem. The servo motor rotates the stem to raise or lower the needle relative to the seat to variably restrict or allow matter flowing from the reservoir to the outlet.

5 Claims, 7 Drawing Sheets

HIGH BANDWIDTH ROTARY SERVO VALVES

This application claims priority to, and incorporates by reference, U.S. Provisional Patent Application Ser. No. 60/567,156 entitled, "Method and Apparatus for High Bandwidth Rotary Servo Valves," which was filed on Apr. 30, 2004.

BACKGROUND OF THE INVENTION

This invention was made with government support under grant DAAD190110509 awarded by the Defense Advanced Research Projects Agency. The government has certain rights in this invention.

I. Field of the Invention

The present invention relates to valves. More particularly, this disclosure involves direct-acting servomotor valves that enable high-bandwidth control of cold gas, hot gas, and/or liquids.

II. Description of Related Art

In many applications in which servo control valve systems are utilized, pressurized fluid is typically provided from a high pressure source and transmitted through a load from which the fluid is then exhausted to a low pressure reservoir. The load may, for example, take the form of a double-acting piston operating within a cylinder. The transfer of fluid from one side of the piston to the other within the cylinder causes the piston to move some mechanism to which it is connected.

Conventional servo valves are often linear motion devices. They typically consist of a spool element operated manually or electrically. Typically the spool element is shuttled back and forth within a chamber defined within a valve housing. However, the linear motion of the spool element is not precise, resulting in a decrease in performance. Further, in order to provide an efficient flow system, the valve configurations are often bulky and may increase the cost of the overall linear actuator.

These shortcomings are not intended to be exhaustive, but rather are among many that tend to impair the effectiveness of previously known techniques concerning servo valves; however, those mentioned here are sufficient to demonstrate that the methodologies appearing in the art have not been altogether satisfactory and that a significant need exists for the techniques described and claimed in this disclosure.

SUMMARY OF THE INVENTION

There is a need for a high bandwidth valve configuration directly actuated by a servoactuator, such as a DC servomotor.

In one embodiment, the invention involves a valve including a rotating, substantially pressure-balanced spool that selectively aligns openings within the spool with openings within a sleeve to selectively connect ports of a manifold for gas or liquid routing.

In another embodiment, the invention involves a valve including a manifold, a sleeve, a spool, and a servo motor. The manifold includes ports. The sleeve is coupled to the manifold, and the sleeve includes openings and radial grooves. The spool is within the sleeve, and the spool includes openings. The servo motor is coupled to the spool. The openings and radial grooves of the sleeve are configured to substantially pressure balance the spool within the sleeve. The openings of the of the spool are configured to selectively align with openings of the sleeve, upon rotation by the servo motor, to selectively connect ports of the manifold for gas or liquid routing. The manifold may include three ports. In a three port embodiment, the sleeve may include two radial grooves, each radial groove having a set of substantially opposing holes. In a three port embodiment, the spool may include two holes spaced substantially 90 degrees apart. The manifold may include four ports. In a four port embodiment, the sleeve may include four radial grooves, each of two radial grooves having four substantially equally spaced holes and each of the two other radial grooves having a set of substantially aligned holes. In a four port embodiment, the spool may include two sets of opposing slots, a first set of slots being located substantially 90 degrees from a second set of slots.

In another embodiment, the invention involves a valve including a stem, a needle, a seat, a reservoir, an outlet, and a servo motor. The needle is coupled to the stem. The seat is configured to receive the needle. The outlet is coupled to the reservoir. The servo motor is coupled to the stem and is configured to rotate the stem to raise or lower the needle relative to the seat to variably restrict or allow matter flowing from the reservoir to the outlet. The needle may be threaded on an outer surface and being screwed into a valve body. The reservoir may contain a fluid reservoir and the matter may include a liquid.

In another embodiment, the invention involves a method. Gas is routed about openings and radial groove of a valve sleeve to substantially pressure balance a valve spool. Openings of the spool are selectively aligned with openings of the sleeve by rotating a servo motor to selectively connect ports of a manifold for gas or liquid routing. The manifold may include three ports, in which case the aligning of openings may include aligning one of two opposing holes of the sleeve with one of two holes of the spool that are spaced substantially 90 degrees apart. The manifold may include four ports, in which case aligning of the openings may include aligning holes of the sleeve with slots of the spool that are spaced substantially 90 degrees apart.

The terms "a" and "an" are defined as one or more unless this disclosure explicitly requires otherwise.

The term "approximately" and its variations are defined as being close to as understood by one of ordinary skill in the art, and in one non-limiting embodiment the terms are defined to be within 10%, preferably within 5%, more preferably within 1%, and most preferably within 0.5%. The term "substantially" and its variations are defined as being largely but not necessarily wholly what is specified as understood by one of ordinary skill in the art, and in one-non and in one non-limiting embodiment the substantially refers to ranges within 10%, preferably within 5%, more preferably within 1%, and most preferably within 0.5% of what is specified.

The term "high pressure" is defined according to its ordinary meaning to those having ordinary skill in the art, within its given context in this disclosure. In one non-limiting embodiment, high pressure refers to a pressure higher than atmospheric pressure and resulting from, e.g., a combustion event or reaction.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

The term "coupled," as used herein, is defined as connected, although not necessarily directly, and not necessarily mechanically.

Other features and associated advantages will become apparent with reference to the following detailed description of specific, example embodiments in connection with the accompanying drawings.

BRIEF DESCRIPTION OF THE DRAWINGS

The following drawings form part of the present specification and are included to further demonstrate certain aspects of the invention. The drawings do not limit the invention but simply offer examples.

DESCRIPTION OF ILLUSTRATIVE EMBODIMENTS

The description below is directed to specific embodiments, which serve as examples only. Description of these particular examples should not be imported into the claims as extra limitations because the claims themselves define the legal scope of the invention. With the benefit of the present disclosure, those having ordinary skill in the art will comprehend that techniques claimed and described here may be modified and applied to a number of additional, different applications, achieving the same or a similar result. The attached claims cover all such modifications that fall within the scope and spirit of this disclosure.

The techniques of this disclosure can be applied to many different type of systems, including any application requiring a valve, and particularly a high-bandwidth valve, as will be recognized by those having ordinary skill in the art.

Embodiments of this disclosure involve high bandwidth proportional rotary servo valves actuated by direct-acting servomotors. "Direct-acting" signifies that power to move a spool or poppet element of a servo valve is directed by a servo actuator, such as a DC servo motor. Valves according to embodiments of this disclosure may provide increased sensing advantages as well as advantages in delivering torque for hydraulic and pneumatic systems. Further, the valves provides for accurate control of fluid flow, such as liquids or hot gas with temperatures reaching approximately 500° F. Additionally, the rotary configuration of embodiments enables and integrated sensors and gearhead into a servo actuator. The techniques provide, in example embodiments, unique 3-way and 4-way designs. The techniques provide a pressure-balanced operation that enables low-torque activation. The air-bearing effect decreases friction, and the compact spool design of different embodiments decreases rotational inertia. In embodiments directed to a 4-way design, only four ports are needed, whereas a typical linear 4-way valve requires five ports. The geometric configuration of different embodiments provides low distortion thermal expansion. Those having ordinary skill in the art will recognize many other advantages and features of the invention by reference to this description with its accompanying drawings.

I. 3-Way Valve Configuration

In one embodiment, a 3-way valve configuration may include two inlet ports and one outlet port, in which case the valve connects either one inlet or the other to the outlet with a controllable orifice area. Alternatively, a 3-way valve configuration may include one inlet port and two outlet ports, in which case the valve connects the inlet to either one outlet or the other with a controllable orifice area.

Figure 1:
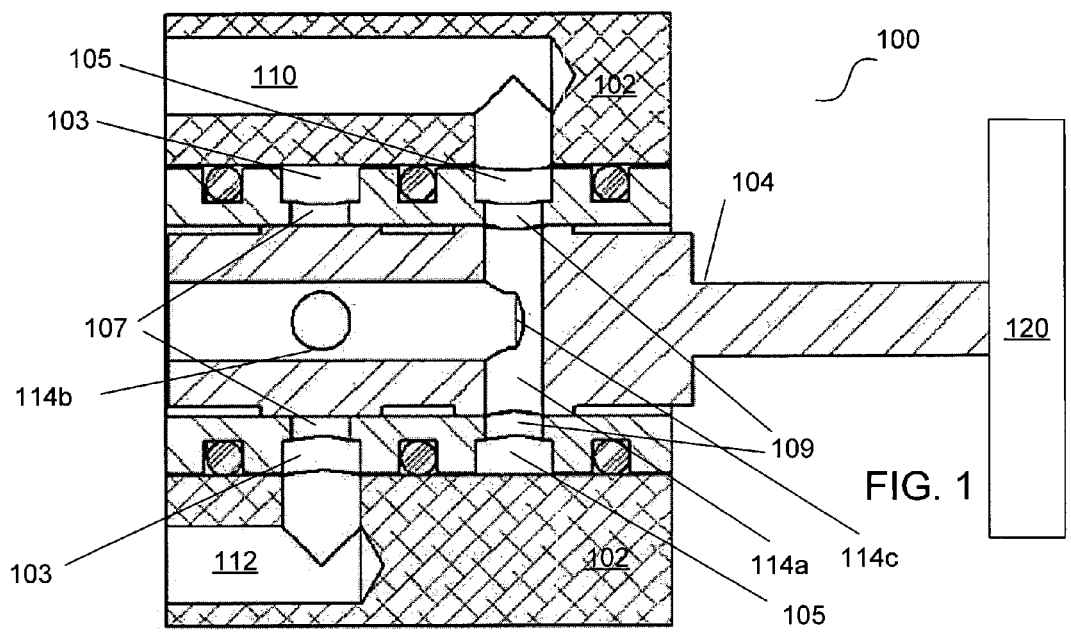
FIGS. 1-3 show a 3-way valve configuration according to embodiments of the disclosure.

Referring to FIG. 1, an example 3-way valve configuration 100 includes a manifold 102 that directs the flow of gas from two chambers 110 and 112 into either a first radial groove 103 or second radial groove 105 cut into a sleeve 106. The sleeve 106 is coupled to the manifold 102, and the radial grooves 103 and 105 allow gas to flow around the sleeve 106 and through holes 107 and 109, which are situated on opposite sides of the sleeve 106 as illustrated. Holes 107 and 109, along with grooves 103 and 105, allow gas pressure to be applied substantially equally to both sides of a spool 104 so that spool 104 may be pressure balanced (e.g., so that it may rotate more freely). Pressure balancing minimizes friction, reduces the amount of force needed to turn the spool 104, and creates something akin to an air bearing effect.

In the illustrated embodiment, spool 104 includes two holes 114*a* and 114*b* spaced substantially 90 degrees apart that connect to an exhaust hole 114*c* (which can alternatively be configured as a supply hole) that runs along its axis and out to atmospheric pressure. In another embodiment (not shown), the sleeve 106 can have holes spaced substantially 90 degrees apart (instead of the holes 114*a* and 114*b* of the spool 104 being spaced substantially 90 degrees apart), and holes in the spool 104 may be lined up (instead of the holes 107 and 109 of the sleeve 106 lining up).

Spool 104 is rotated in the sleeve 106 by use of, in one embodiment, a servo motor 120. Servo motor 120 may be rotated precisely as is known in the art and may be associated with one or more sensors and/or feedback mechanisms to ensure proper operation. Through rotation, hole 114*a* or 114*b* of the spool 104 may be aligned with the appropriate holes 107 or 109 so as to supply and/or exhaust chambers 110 or 112.

To exhaust pressure from chamber 110, sleeve 104 is rotated so that hole 114*a* of spool 104 is aligned with holes 109 in the sleeve 106, as shown in FIG. 1. Gas from chamber 110 travels through top hole 109, into hole 114*a*, and into hole 114*c*, which runs to the left in FIG. 1 along longitudinal axis of spool 104. The gas is exhausted out of the manifold 102 to atmospheric pressure, in one embodiment. In the orientation of FIG. 1, chamber 112 is blocked because hole 114*b* in the spool 104 is not lined up with holes 107 in sleeve 106.

Figure 2:
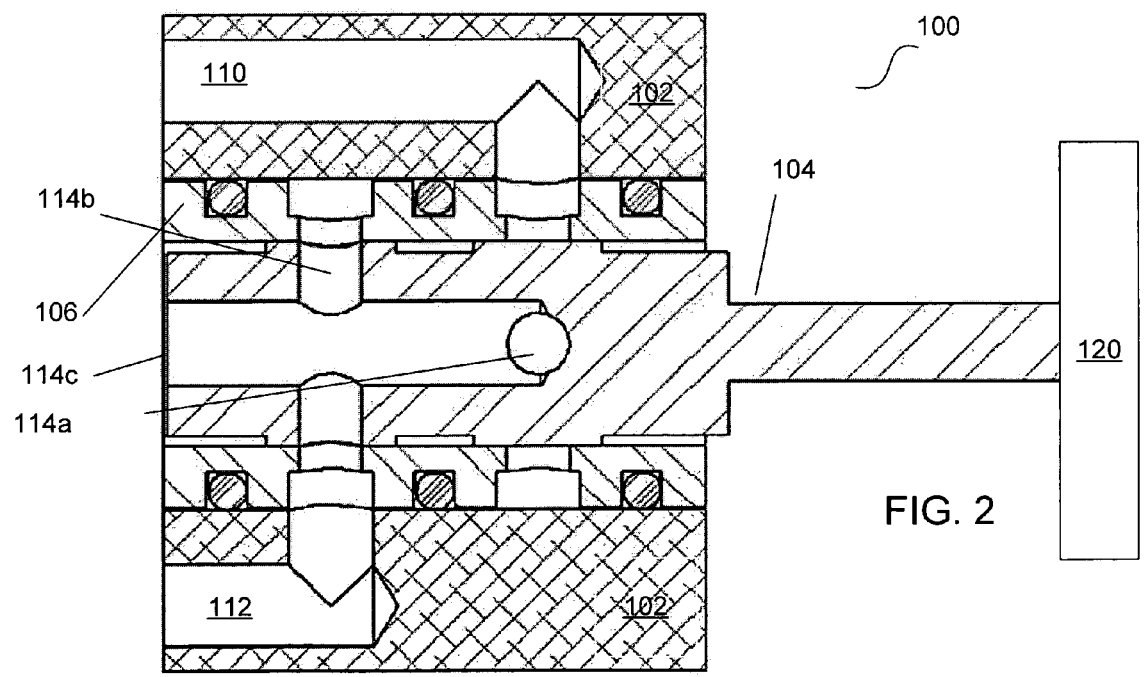

To exhaust pressure from chamber 112, sleeve 104 is rotated 90 degrees from that shown in FIG. 1 so that hole 114b of spool 104 is aligned with holes 107 of sleeve 106, as shown in FIG. 2. Gas from chamber 112 travels through top hole 107, into hole 114b, and into hole 114c, which runs to the left in FIG. 2 along longitudinal axis of spool 104. The gas is exhausted out of the manifold 102 to atmospheric pressure, in one embodiment. In the orientation of FIG. 2, chamber 110 is blocked because hole 114a in the spool 104 is not lined up with holes 109 in sleeve 106.

Figure 3:
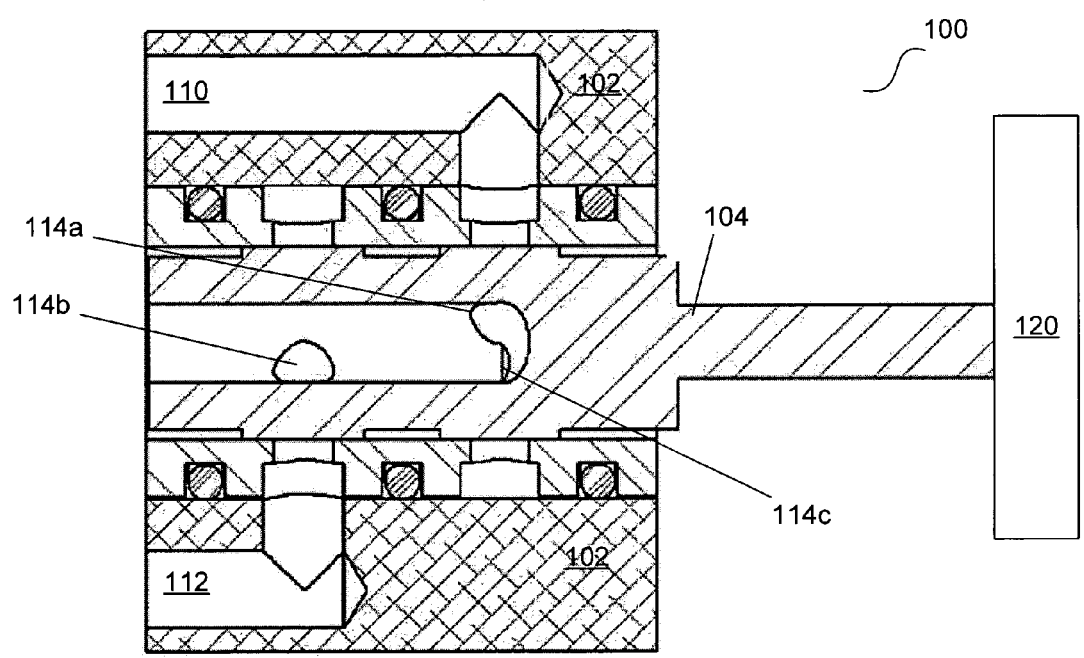

In one embodiment, referring to FIG. 3, both chambers 110 and 112 are blocked because spool 104 is rotated 45 degrees from the orientations shown in FIGS. 1 and 2. In FIG. 3, holes 114a and 114b are not aligned with either of hole sets 107 or 109.

Because sleeve 106 and spool 104 provide a substantial pressure balance, spool 104 may be rotated very easily—low torque activation is made possible. Further, because of the precision of servo motor 120, chambers 110 and 112 may be readily accessed accurately (and quickly).

II. 4-Way Valve Configuration

Figure 4:
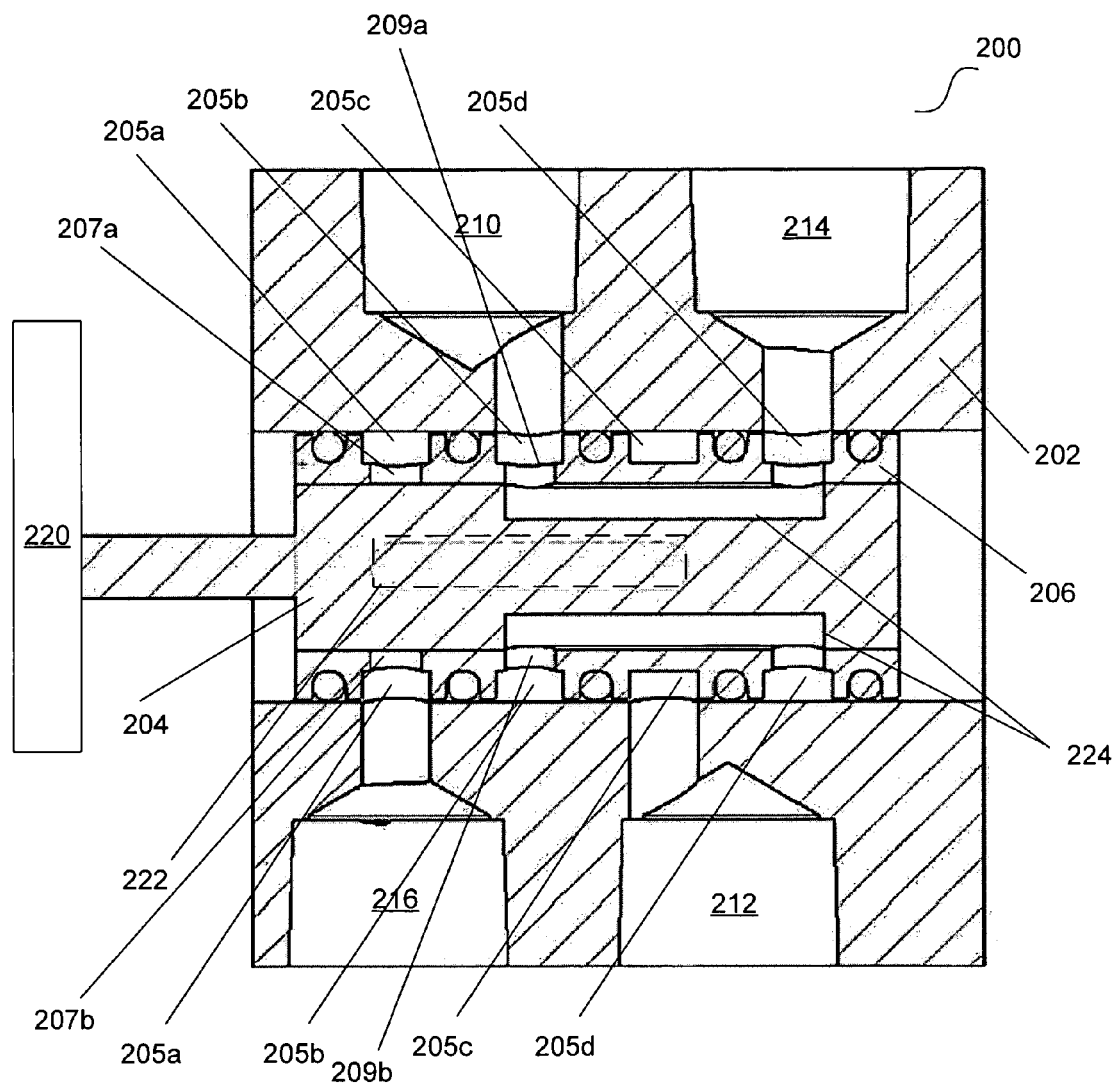
FIG. 4 shows a 4-way valve configuration according to embodiments of the disclosure.

In one embodiment, a 4-way valve configuration may include two inlet ports and two outlet ports. The valve may connect either inlet with either outlet with a controllable orifice area and connects the other inlet/outlet pair with the same area. With reference to FIG. 4, a 4-way valve configuration 200 may connect chamber 210 to a supply port 214 and connect chamber 212 to an exhaust port 216. The 4-way valve configuration may also connect chamber 212 to supply port 214 and chamber 210 to exhaust port 216.

Manifold 202 provides a porting path for chambers 210 and 212 and may also supply a porting path for supply and exhaust pressures (see elements 214 and 216 respectively), as shown in FIG. 4. A sleeve 206 is coupled to manifold 202 and includes radial grooves 205a, 205b, 205c, and 205d that allow gas to flow around sleeve 206 and through holes (such as 207a) in sleeve 206. In this embodiment, there are four radial grooves, while in the 3-way embodiment, there are two radial grooves.

The pressure (supply) groove 205d and exhaust groove 205a each include 4 substantially equally spaced holes (holes 207a and 207b being two such holes for exhaust 216). Chambers 210 and 212 may each have 2 opposing groove holes (such as 209a and 209b for chamber 210). The grooves and groove holes, like the 3-way embodiments of FIGS. 1-3, allow pressure from gas to be applied substantially equally to both sides of spool 204, providing advantageous pressure balancing.

Figure 9:
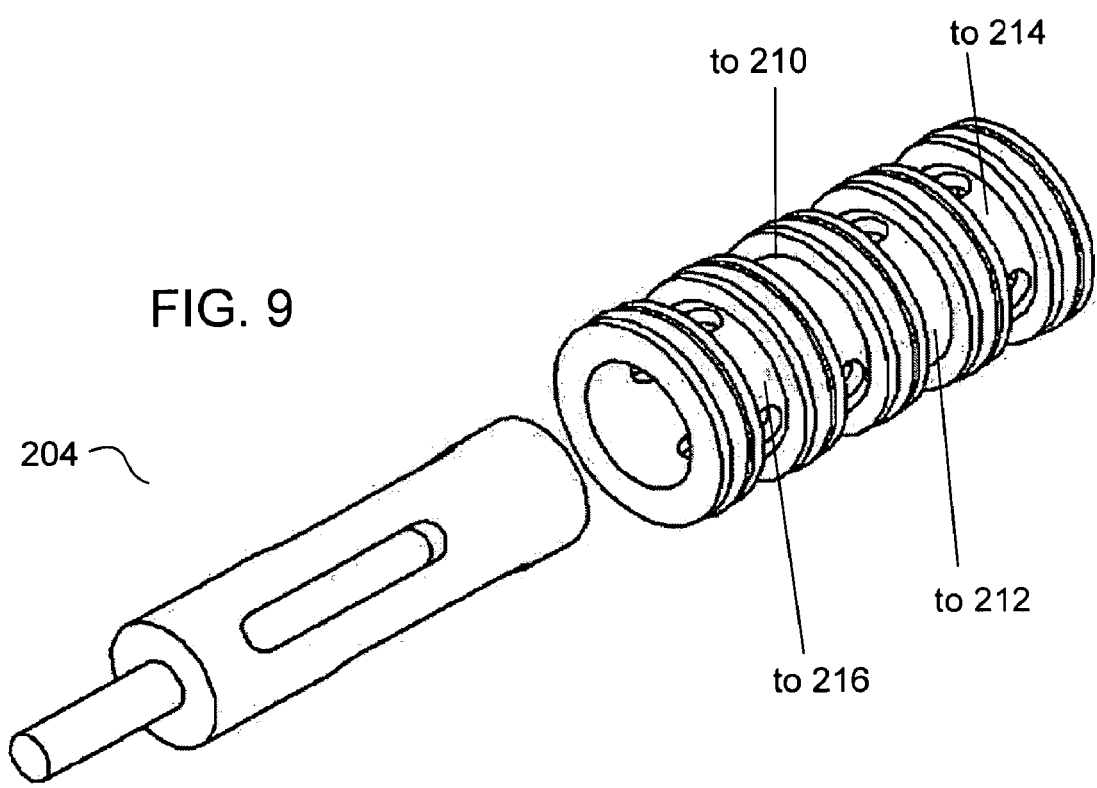
FIG. 9 shows a sleeve component of a 4-way valve configuration according to embodiments of the disclosure.

Spool 204 includes two sets of opposing slots cut into the sides, which connect chambers 210 and 212 alternately with supply and exhaust. The first set of slots 222, as shown in FIG. 4, span from exhaust 216 to either chambers 210 or 212 depending on its orientation. The second set of slots 224 are located substantially 90 degrees from the first set and span from supply 214 to either chambers 210 or 212 depending on its orientation. The spanning slots, relative to chamber locations may also be seen with reference to FIGS. 5, 7, and 9, which show a three-dimensional perspective.

A servo motor 220 is connected to spool 204 and may be used to rotate spool 204 within the sleeve 206.

Figure 5:
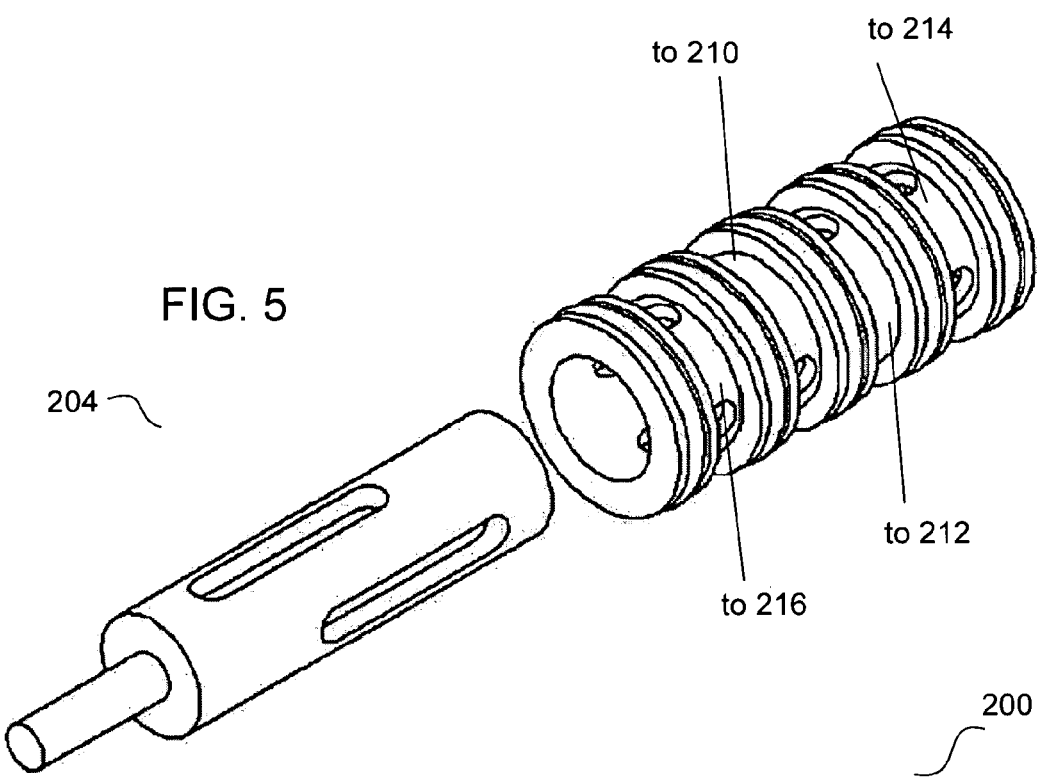
FIG. 5 shows a sleeve component of a 4-way valve configuration according to embodiments of the disclosure.

Referring to FIGS. 4 and 5, the spool 204 has been rotated so that one of the set of slots 214 is connecting chamber 210 with supply 214, and chamber 212 is connected to exhaust 216 via one of the set of slots 222 (out of view in FIG. 4). FIG. 5 shows this arrangement in three dimensions, where it can be seen that the top slot will line up exhaust 216 with chamber 212, and the lower slot will line up chamber 210 with supply 214.

Figure 6:
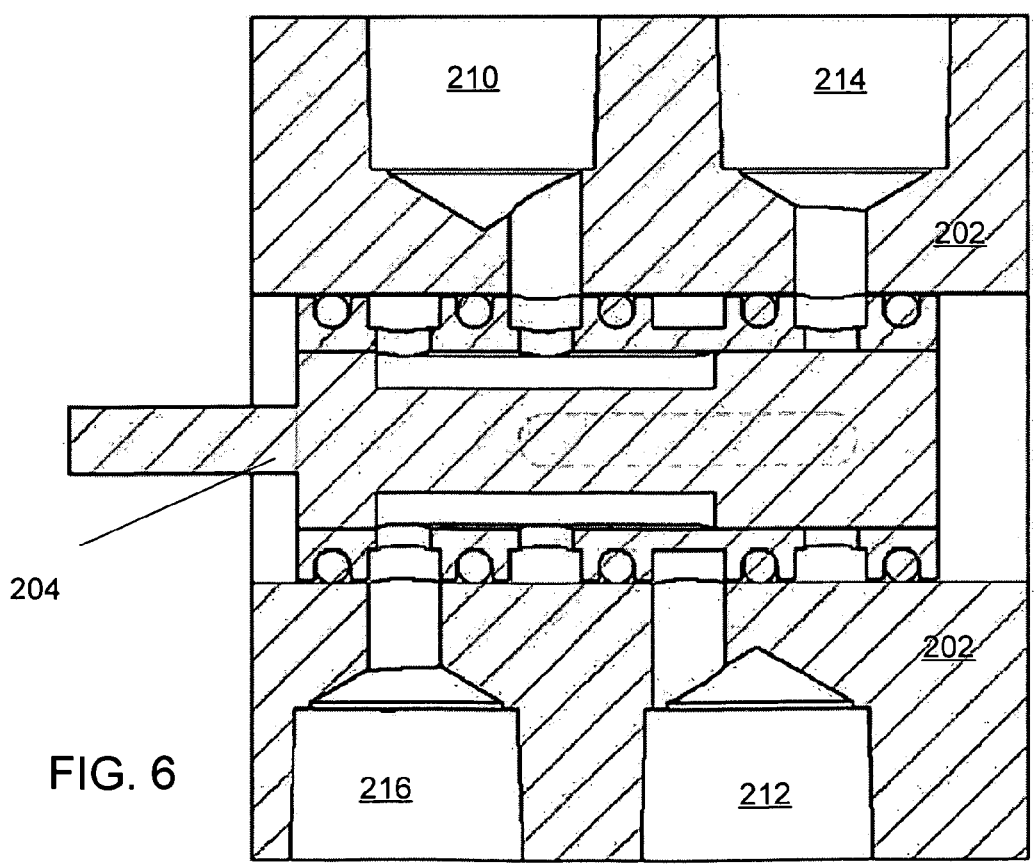
FIG. 6 shows a 4-way valve configuration according to embodiments of the disclosure.
Figure 7:
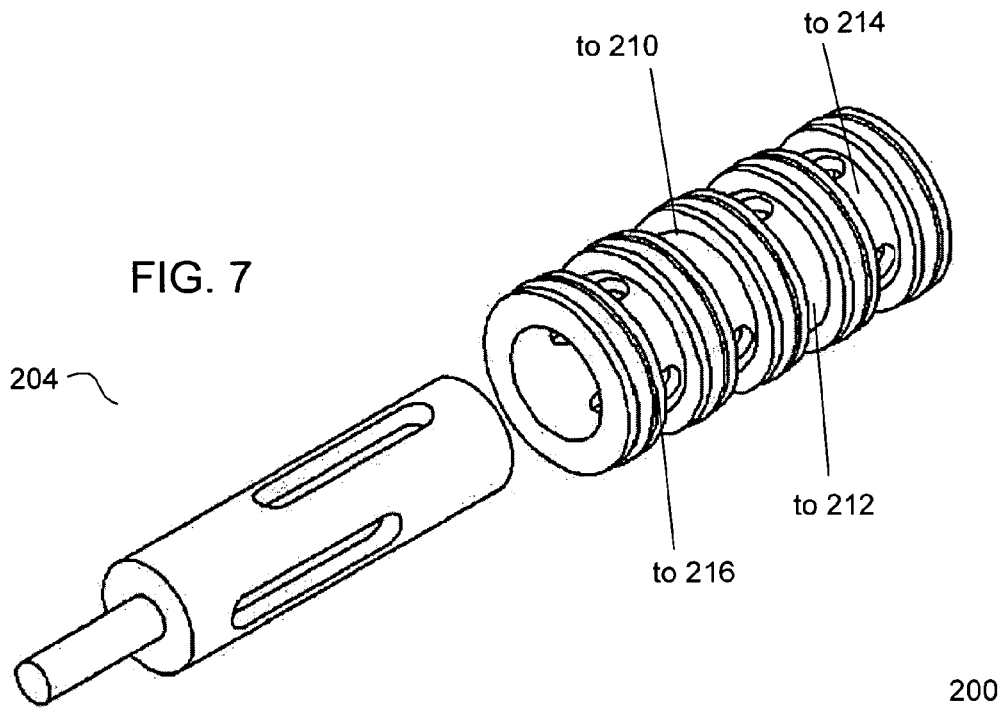
FIG. 7 shows a sleeve component of a 4-way valve configuration according to embodiments of the disclosure.

Referring to FIGS. 6 and 7, the spool 204 has been rotated so that one of the set of slots is connecting chamber 210 with exhaust 216, and chamber 212 is connected to supply 214 via one of the other set of slots.

Figure 8:
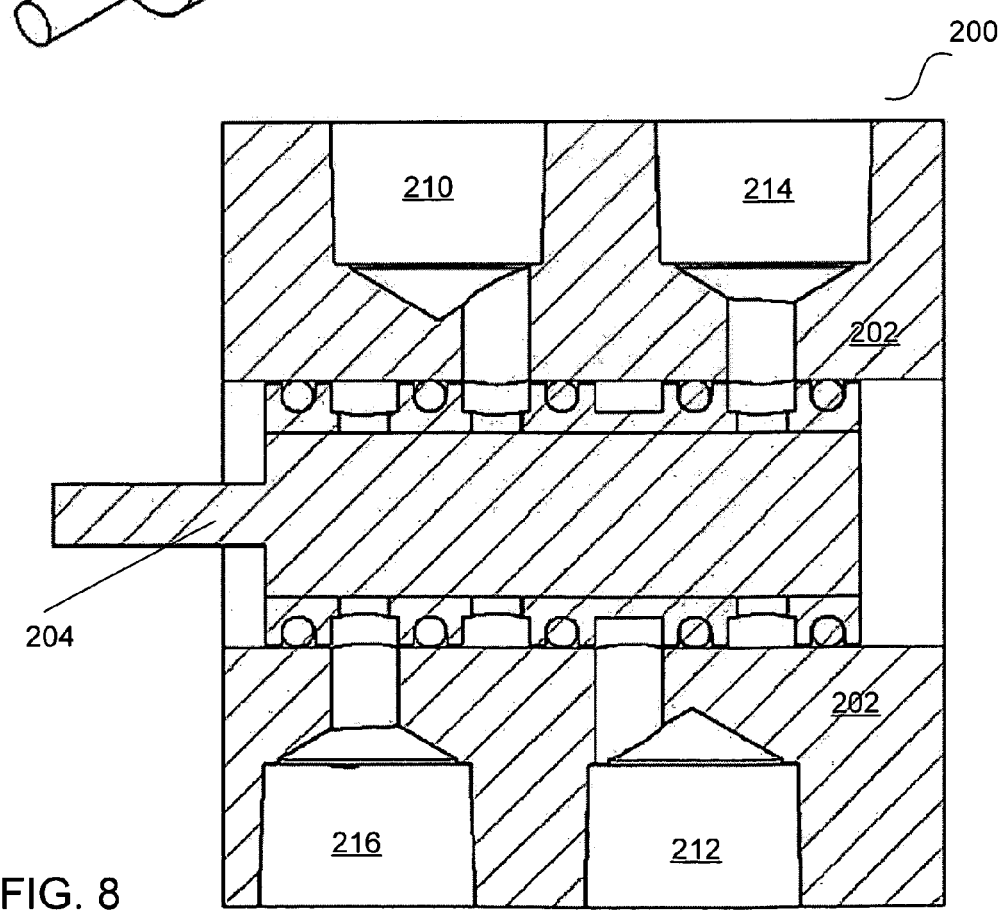
FIG. 8 shows a 4-way valve configuration according to embodiments of the disclosure.

To block chambers 210 and 212, the spool 204 is turned substantially 45 degrees to either orientation shown in FIGS. 4 and 5 or FIGS. 6 and 7. This orientation can be seen in FIGS. 8 and 9.

It is noted that the above embodiments may be modified for multiple port configurations. For example, a 2-way valve configuration may connect an inlet port to an outlet port with a controllable orifice area. Similarly, a 5-way, 6-way or other valve configurations may be made using the same techniques.

III. Liquid Valve Configuration

Figure 10:
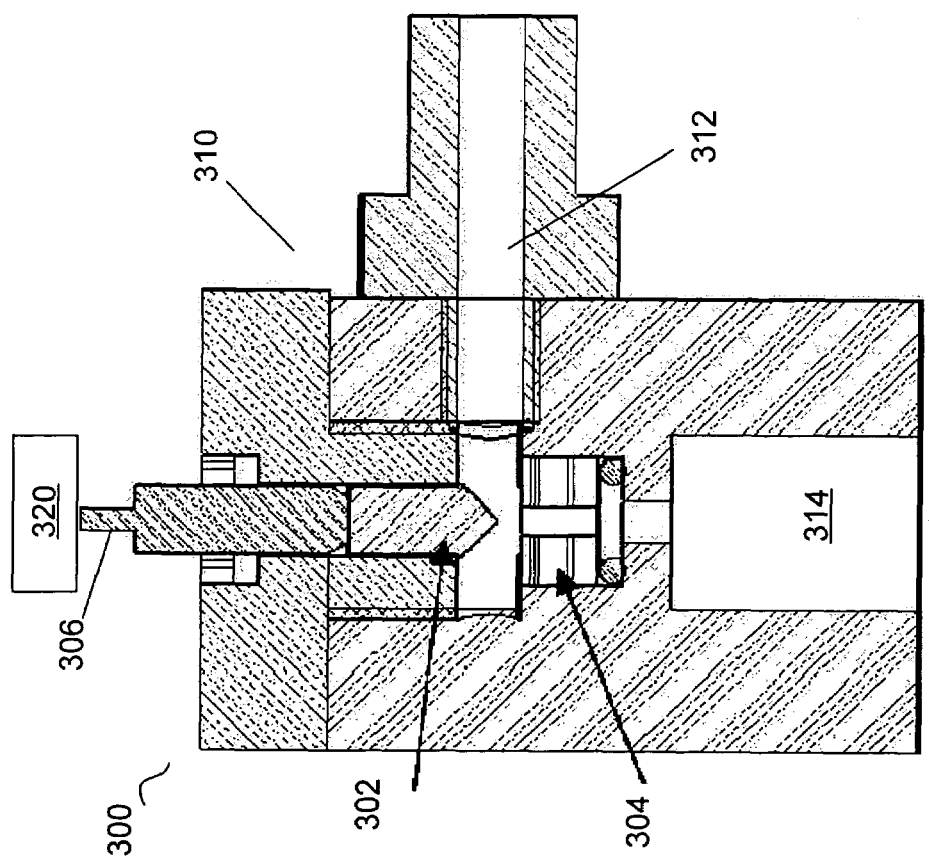

In one embodiment, a servo motor may be coupled to a liquid valve configuration. Referring to FIG. 10, liquid valve 300 may include of a needle 302, a seat 304, and a stem 306, all contained within a body 310. The needle 302 may be threaded and screwed into the body 310, which may have complementary threads to accept the needle 302.

When the needle 302 in the up or open position, as shown in FIG. 10, liquid may flow through the opening from the liquid reservoir 312 and out through the outlet of the valve 314.

Figure 11:
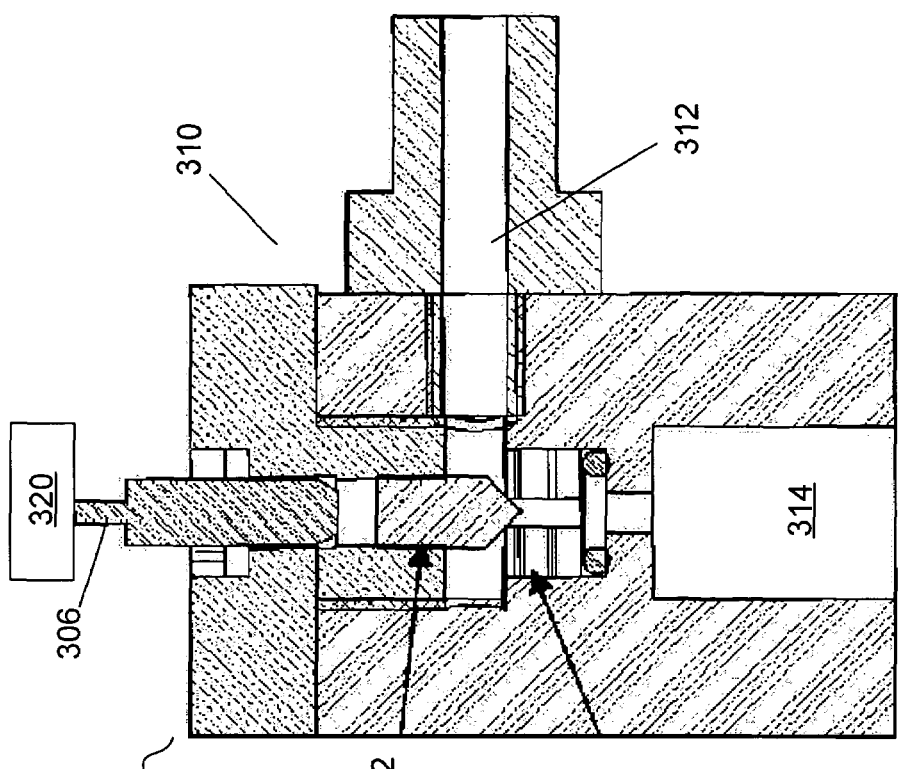
FIGS. 10-11 show a liquid valve configuration according to embodiments of the disclosure.

The valve 314 is closed, as shown in FIG. 11, when the needle 302 is driven down into the seat by the rotation of the stem 306, which is coupled to the needle 302 by a sliding connection. The valve can be proportionally opened and closed by rotation of the stem 306, which is connected to servo motor 320.

With the benefit of the present disclosure, those having ordinary skill in the art will recognize that techniques claimed here and described above may be modified and applied to a number of additional, different applications, achieving the same or a similar result. The attached claims cover all such modifications that fall within the scope and spirit of this disclosure.

REFERENCES

Each of the following references is incorporated by reference.

U.S. Pat. No. 4,800,924
U.S. Pat. No. 5,954,093
U.S. Pat. No. 5,467,800

The invention claimed is:

1. A valve comprising:
   a manifold comprising ports;
   a sleeve coupled to the manifold, the sleeve comprising openings and radial grooves;
   a spool within the sleeve, the spool comprising openings; and
   a servo motor coupled to the spool;
   where the openings and radial grooves of the sleeve are configured to substantially pressure balance the spool within the sleeve;
   where openings of the of the spool are configured to selectively align with openings of the sleeve, upon rotation by the servo motor, to selectively connect ports of the manifold for gas or liquid routing;

where the manifold comprises four ports;

where the sleeve comprises four radial grooves, each of two radial grooves having four substantially equally spaced holes and each of the two other radial grooves having a set of substantially aligned holes; and where the spool comprises two sets of opposing slots, a first set of slots being located substantially 90 degrees from a second set of slots.

2. The valve of claim 1, wherein the first set of slots is axially offset from the second set of slots.

3. The valve of claim 1, wherein the two sets of opposing slots do not extend through a cross-section of the spool.

4. The valve of claim 1, wherein the spool may be aligned with the sleeve so that a first slot from the first set of slots can be aligned with a first pair of openings of the sleeve while a second slot from the first set of slots is aligned with a second pair of openings of the sleeve.

5. The valve of claim 1, wherein the spool may be aligned with the sleeve so that none of the slots are aligned with any of the openings of the sleeve.

* * * * *

UNITED STATES PATENT AND TRADEMARK OFFICE
CERTIFICATE OF CORRECTION

| | | |
|---|---|---|
| PATENT NO. | : 7,322,375 B2 | Page 1 of 1 |
| APPLICATION NO. | : 11/120140 | |
| DATED | : January 29, 2008 | |
| INVENTOR(S) | : Michael Goldfarb et al. | |

It is certified that error appears in the above-identified patent and that said Letters Patent is hereby corrected as shown below:

In title page, item (57) Abstract, line 5, please delete "stem." and insert --stem,-- therefor.

In claim 1, column 6, line 64, delete "of the of the" and insert --of the-- therefor.

Signed and Sealed this

Thirteenth Day of May, 2008

JON W. DUDAS
*Director of the United States Patent and Trademark Office*